Patented June 21, 1938

2,121,019

UNITED STATES PATENT OFFICE 2,121,019

PURIFICATION OF ETHER

Walter G. Christiansen, Glen Ridge, and William A. Lott, East Orange, N. J., assignors to E. R. Squibb & Sons, New York, N. Y., a corporation of New York No Drawing. Application April 2, 1937, Serial No. 134,682

14 Claims. (Cl. 260—151)

This application is a continuation in part of application Serial No. 635,600, filed September 30, 1932.

This invention relates to the purification of ether.

Aldehydes form in ether during its manufacture (as by the oxidation of ethyl alcohol in the presence of sulfuric acid) and subsequently (as by the decomposition of peroxides), and constitute an impurity that tends to make the ether unfit for anesthetic use.

It is the object of this invention to provide an efficient method of removing aldehydes from ether.

In the practice of this invention, aldehyde-containing ether is contacted with a solution of an aryl hydroxide—especially a compound selected from the class consisting of resorcinol, pyrogallol, tannic acid, ortho-phenyl phenol, phenyl catechol, di-normal-propyl resorcinol, and para-amino phenol—in a solvent comprising a nonvolatile water-miscible alcohol, such as glycerine, ethylene glycol, propylene glycol, diethylene glycol, triethylene glycol, and the partial alkyl ethers thereof. Preferably, the aryl hydroxide solution has been made alkaline; thus, when resorcinol is used, it is particularly advantageous to add at least enough sodium hydroxide to convert it into the disodium compound.

The ether treated may be in the liquid or the vapor state; the contact should be thorough, and may be effected by mixing the liquid ether with the contact solution or passing the ether vapor through suitable scrubbing towers; the solvent for the aryl hydroxide may be anhydrous or water-containing, an anhydrous solvent having the advantage that it does not introduce water into the ether and therefore does not interfere with the maintenance of the desirable low water content thereof; preliminary neutralization of the liquid ether or ether vapor to remove acidic materials and preliminary dephlegmation of the ether vapor to remove the large proportion of alcohol vapor, are advisable for prolonging the active life of the contact solution; and in the treatment of the ether vapor the temperature in the aryl hydroxide scrubber should be kept sufficiently high to prevent the ether from condensing, but not much higher.

By employing the method of this invention, it is possible to reduce aldehydes in ether from a proportion many times in excess of that ordinarily found in anesthetic ether, to less than one part of aldehyde in a million parts of ether.

As an example, a continuous stream of ether vapor is passed through a scrubber comprising a more or less conventional apparatus consisting of a tall cylindrical chamber jacketed so as to maintain an external temperature of about 40° C. and filled with (a) contact material such as broken clay plates or pebbles—graded so that the largest are at the bottom and the smallest at the top and separated into sections by horizontal screens—and (b) a solution having the composition

| | |
|---|---|
| Resorcinol | grams 32 |
| 40% sodium hydroxide solution | do 114 |
| Ethylene glycol, enough to make | cc 650 |

(the proportions of sodium hydroxide and resorcinol being such as to form disodium resorcinol). On leaving the scrubber, the ether vapor is freed from any entrained solution and is then condensed. This treatment renders the ether aldehyde-free. Among the many alternative contact solutions are such compositions as 2400 cc. of a saturated solution of potassium hydroxide in anhydrous propylene glycol, combined with either (1) 135 grams of tannic acid or (2) 250 grams of ortho-phenyl phenol.

As a further example, liquid ether may be freed from aldehydes by mixing it thoroughly with a solution such as those specified in the foregoing example, especially the resorcinol solution, the ether being then preferably distilled to eliminate any impurities of low volatility that the contact solution may have introduced.

As a still further example, 100 cc. of liquid anesthetic ether in a 500 cc. separatory funnel is shaken vigorously at about six-minute intervals for half an hour with a solution comprising: 10.04 grams of 36% sodium hydroxide solution; 5 grams of pyrogallol, phenyl catechol, di-normal-propyl resorcinol, or para-amino phenol; and enough monobutyl ether of diethylene glycol to make 100 grams. Then the mixture is allowed to stand until complete separation has occurred, and the contact solution is drawn off.

As a yet further example, any aldehydes in anesthetic ether may be substantially removed and its water content may be minimized, by passing the ether vapor through a scrubber containing a solution of the formula:

| | Pounds |
|---|---|
| Resorcinol | 6 |
| Sodium hydroxide | 8.75 |
| Anhydrous alcohol | 24 |
| Ethylene glycol | 293 |

It is to be understood that the foregoing examples are merely illustrative and by no means limitative of the invention, which may be variously otherwise embodied—for instance, as to the specific aryl hydroxides, solvents, and other ingredients used in the contact solutions, and the procedures and apparatus employed—within the scope of the appended claims.

We claim:

1. The method of removing aldehydes from ether that comprises contacting the ether with a solution of an aryl hydroxide in a solvent comprising in major proportion a nonvolatile water-miscible alcohol.

2. The method of removing aldehydes from ether that comprises contacting the ether with a solution of an aryl hydroxide in an anhydrous solvent comprising in major proportion a nonvolatile water-miscible alcohol.

3. The method of removing aldehydes from ether that comprises contacting the ether with a solution of an aryl hydroxide in a water-containing solvent comprising in major proportion a nonvolatile water-miscible alcohol.

4. The method of removing aldehydes from ether that comprises contacting the ether with a solution of an aryl hydroxide in an alkalized solvent comprising in major proportion a nonvolatile water-miscible alcohol.

5. The method of removing aldehydes from ether that comprises contacting the ether with a solution of resorcinol in a solvent comprising in major proportion a nonvolatile water-miscible alcohol.

6. The method of removing aldehydes from ether that comprises contacting the ether with a solution of resorcinol in an anhydrous solvent comprising in major proportion a nonvolatile water-miscible alcohol.

7. The method of removing aldehydes from ether that comprises contacting the ether with a solution of resorcinol in a water-containing solvent comprising in major proportion a nonvolatile water-miscible alcohol.

8. The method of removing aldehydes from ether that comprises contacting the ether with a solution of resorcinol in an alkalized solvent comprising in major proportion a nonvolatile water-miscible alcohol.

9. The method of removing aldehydes from ether that comprises contacting the ether with a solution of resorcinol in a solvent comprising in major proportion ethylene glycol.

10. The method of removing aldehydes from ether that comprises contacting the ether with a solution of resorcinol in an anhydrous solvent comprising in major proportion ethylene glycol.

11. The method of removing aldehydes from ether that comprises contacting the ether with a solution of resorcinol in a water-containing solvent comprising in major proportion ethylene glycol.

12. The method of removing aldehydes from ether that comprises contacting the ether with a solution of resorcinol in an alkalized solvent comprising in major proportion ethylene glycol.

13. The method of removing aldehydes from ether that comprises contacting the ether with a solution of an aryl hydroxide in an anhydrous solvent comprising ethyl alcohol and a nonvolatile water-miscible alcohol, the latter being in major proportion.

14. The method of removing aldehydes from ether that comprises contacting the ether with a solution of resorcinol in an anhydrous alkalized solvent comprising ethyl alcohol and ethylene glycol, the latter being in major proportion.

WALTER G. CHRISTIANSEN.
WILLIAM A. LOTT.